US006933965B2

(12) United States Patent
Heafitz

(10) Patent No.: US 6,933,965 B2
(45) Date of Patent: Aug. 23, 2005

(54) PANORAMIC AERIAL IMAGING DEVICE

(75) Inventor: Andrew Heafitz, Cambridge, MA (US)

(73) Assignee: Tacshot, Inc., Cambridge, MA (US)

(*) Notice: Subject to any disclaimer, the term of this patent is extended or adjusted under 35 U.S.C. 154(b) by 639 days.

(21) Appl. No.: 10/096,567

(22) Filed: Mar. 13, 2002

(65) Prior Publication Data

US 2002/0196339 A1 Dec. 26, 2002

Related U.S. Application Data

(60) Provisional application No. 60/275,378, filed on Mar. 13, 2001.

(51) Int. Cl.[7] ............................. H04N 7/18; H04N 9/47
(52) U.S. Cl. ....................................................... 348/144
(58) Field of Search .................................. 348/144, 164, 348/145, 195; 250/334, 202, 203; H04N 7/18, 9/47

(56) References Cited

U.S. PATENT DOCUMENTS

| | | | |
|---|---|---|---|
| 3,143,048 A | 8/1964 | Davies ........................ 95/12.5 |
| 3,721,410 A | 3/1973 | Anspacher ................. 244/3.14 |
| 3,924,824 A | * 12/1975 | Brodie et al. ................. 244/3.2 |
| 3,925,794 A | 12/1975 | Alouges ........................ 354/70 |
| 4,103,160 A | 7/1978 | Moss ........................... 250/334 |
| 4,148,260 A | * 4/1979 | Minovitch ............... 104/138.1 |
| 4,533,945 A | 8/1985 | Lauvray et al. ............. 358/109 |
| 4,543,603 A | 9/1985 | Laures ........................ 358/109 |
| 4,589,342 A | * 5/1986 | Rousseau .................... 102/377 |
| 4,700,307 A | * 10/1987 | Mons et al. ................. 701/220 |
| 4,886,222 A | 12/1989 | Burke ......................... 244/1 R |
| 4,922,337 A | 5/1990 | Hunt et al. .................. 358/101 |
| 4,949,108 A | 8/1990 | Verret .......................... 354/81 |
| 5,185,667 A | 2/1993 | Zimmermann ............... 358/209 |
| 5,200,818 A | 4/1993 | Neta et al. ..................... 358/87 |
| 5,259,584 A | 11/1993 | Wainwright ................. 248/542 |
| 5,359,363 A | 10/1994 | Kuban et al. .................. 348/36 |
| 5,384,588 A | 1/1995 | Martin et al. .................. 348/15 |
| 5,612,533 A | 3/1997 | Judd et al. ................ 250/208.1 |
| 5,615,847 A | * 4/1997 | Bourlett ........................ 244/63 |
| 5,649,032 A | 7/1997 | Burt et al. ................... 382/284 |
| 5,650,813 A | 7/1997 | Gilblom et al. ............... 348/36 |
| 5,684,498 A | * 11/1997 | Welch et al. ................... 345/8 |
| 5,760,826 A | 6/1998 | Nayar .......................... 348/36 |
| 5,765,044 A | 6/1998 | Murai et al. .................. 396/13 |
| 5,903,782 A | 5/1999 | Oxaal ........................... 396/50 |
| 5,990,941 A | 11/1999 | Jackson et al. ............. 348/207 |

FOREIGN PATENT DOCUMENTS

DE  9302733.8 U1  10/1993
DE  19950465 A1  11/2000

OTHER PUBLICATIONS

Video Imaging Projectile Pictures Terrain Below Its Path, *Department of Energy*, 2301 NTIS Tech Notes, Springfield, VA, (1990).

* cited by examiner

*Primary Examiner*—Nhon Diep
(74) *Attorney, Agent, or Firm*—Choate, Hall & Stewart LLP

(57) ABSTRACT

An imaging device that gives a ground based user immediate access to a detailed aerial photograph of the entire area for a given radius about his present position. The device can be launched into the air, and rotates in a predictable pattern to scan an imager over every point of the ground, from a vantage point high in the air. These pictures can be stored or transmitted to the ground and assembled on a computer to form a spherical picture of everything surrounding the imaging device in the air.

44 Claims, 4 Drawing Sheets

PANORAMIC AERIAL IMAGING DEVICE

This application claims benefit of U.S. Provisional Application No. 60/275,378, filed Mar. 13, 2001, which is incorporated by reference herein.

FIELD OF THE INVENTION

The present invention relates generally to a device to take a spherical or hemispherical panoramic image from a specific point in the air, and more particularly, to a simple device with no moving parts that rotates about two axes to scan the imaging device over the ground in two axes, such that the images can be put together to create a panoramic image.

BACKGROUND OF THE INVENTION

A person on the ground, such as a soldier, may need to know what is in the immediately surrounding area. Reconnaissance of an area can often be efficiently done from the air. (For example, it has been reported that tanks operating in urban environments require helicopter support before turning a street corner, to detect anti-tank weapons). However, manned aircraft are expensive, not always readily available, may not have access to the area to be looked at and a direct link to the person at the site is not always available. Satellites are only available a few times each day at predictable times, the resolution of commercial imaging satellites is not very good, and again, the ability to get the information to the person at the site is limited. Unmanned aircraft flown by the person at the site are large, expensive or difficult to operate, and require an open area for launch and recovery. Recovery is necessary because of the expense involved. Larger unmanned aircraft flown from fixed bases have many of the same problems as manned aircraft. Balloons are time consuming to inflate and fly, and depend too much on calm wind conditions.

Aircraft or satellites over-flying an area typically take vertical photographs of the earth directly below the vehicle, or panoramic photographs that extend out to either side. A large amount of ground can then be covered by flying the vehicle in a forward direction and combining the photographs into a long strip.

These methods are expensive, and not in the direct control of the person requiring the photographs, so there is an inherent time delay in getting the images to him.

Systems that are portable, and can be carried into the field, require input from the user to aim the imaging sensor at targets of interest. This is also time consuming, and involves some level of skill and practice to be able to control the imaging device accurately.

A device that loiters above the operator may also give away his position if it is detected. The chances of detection go up with time.

A lightweight, man-portable device that automatically gives the person an immediate and detailed view of the entire surrounding area, centered on his position is not available.

SUMMARY OF THE INVENTION

An object of the invention is to provide the user immediate access to detailed aerial photographs of the entire surrounding area out to a certain radius.

Another object of the invention is to provide a device that gathers this information with an imaging device from a substantially stationary point in the air above the operator.

Another object of the invention is to provide a device that can generate its pictures with no control from the ground, or user input, once it has been put into the air. To achieve this objective, the vehicle system of the invention gathers a series of images by rotating the imager in a predictable pattern along two separate axes that covers a spherical area, or a portion of a sphere. Optionally, if the device loiters in the air, it may be controlled to further examine an object of interest discovered in the initial set of images.

In some aspects, the invention provides a device that is spun up to the scanning speed along the first axis using fins that impart a torque about the roll axis as it moves through the air. The imaging device may be fixed with respect to the body of the device, with the optical axis perpendicular to the roll axis. To prevent blurred images, the shutter speed, or data collection time of the imager, is short enough to be considered insignificant compared to the angular rotation rate. The second scanning axis is provided by the device pitching over at the peak of a steep ballistic trajectory.

Another object of the invention is to provide a sensor that can be used to measure the orientation of the imaging device to assist in orienting the information from the imager. Alternately the imaging device may gather this information without scanning, using a wide angle or fisheye lens.

Another object of the invention is to provide a system where the data from the imaging device is stored or transmitted down to the operator and the operator can map all of the imaging data onto a spherical surface using a computer. The computer may then display the data on a display, such as the screen of a laptop computer, and allow the user to pan, zoom or perform other operations using the data, including, but not limited to object recognition, motion detection, range finding and geo-location.

As used herein, an "image" or "imagery data" is a collection of sensor data where each datum is associated with a relative location (e.g., a rectangular array of pixels). An "imager" or an "imaging device" is any sensor that collects imagery data.

As used herein, a "gun" includes any member of the class of small arms and light weapons, as defined by the UN Panel of Experts on Small Arms and approved by the United Nations General Assembly in 1997.

As used herein, a "data transmitter" includes wireless, wired, fiber optic, and other equivalent systems for transferring data from one location to another, although wireless systems are preferred in most embodiments of the invention.

As used herein, a "portable" vehicle is one that can be transported on a vehicle such as a light truck or a tank. A "man-portable" vehicle is one that can be carried by one to four men, and preferably one that can be carried by a single man.

BRIEF DESCRIPTION OF THE DRAWING

The invention is described with reference to the several figures of the drawing, in which.

DETAILED DESCRIPTION

Figure 1:
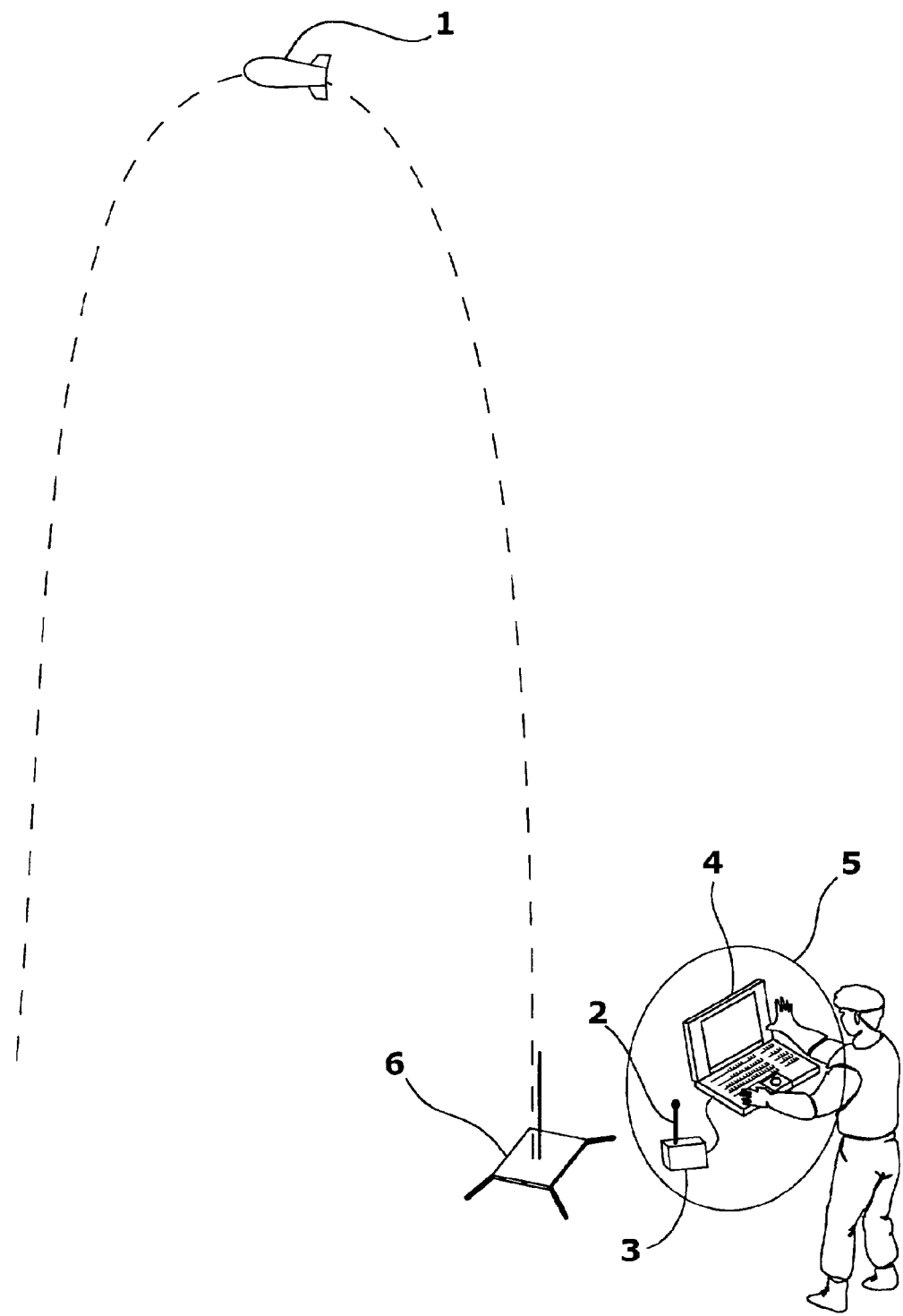
FIG. 1 shows an overview of one embodiment of the system including the aerial vehicle, the operator and the ground system.

FIG. 1 shows a device 1 according to the invention launched in a ballistic trajectory, from a small, portable launch pad 6. The images from the device 1 are transmitted to the operator with a portable ground station 5 where they are received by the receiver 3 using the antenna 2, and transferred to the portable computer 4. The computer arranges the images in a complete panorama, covering the entire area as seen by the flight vehicle 1 at the top of its trajectory.

Figure 2:
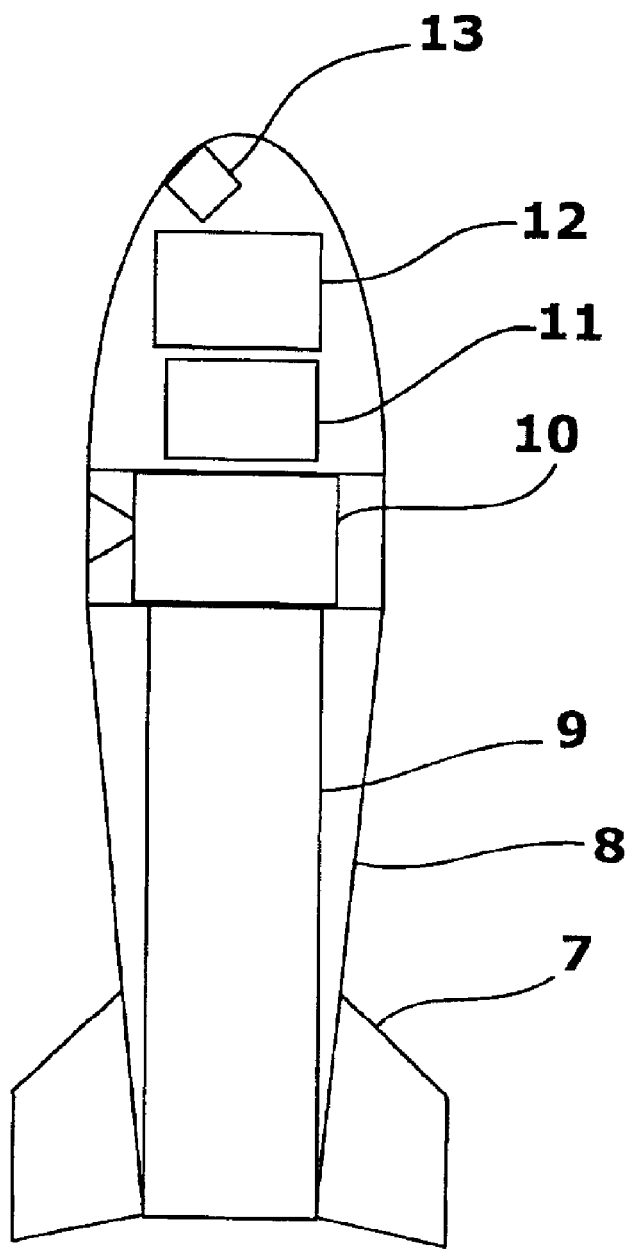
FIG. 2 shows a cutaway detail of the aerial vehicle of FIG. 1.

FIG. 2 shows a cut away detail of one flight vehicle according to the invention. It is launched into the air using a small solid fueled rocket motor 9. Those of ordinary skill in the art will appreciate that the ideal height of launch will depend on the area to be viewed and the quality of the imager, and may range from as low as ten feet to as high as 30,000 feet, or even up to 100,000 feet or more for some vehicles. The best propulsion device will depend upon the desired height, and possibly on other factors such as radar visibility and noise. A great many propulsion devices are possible, such as motors and engines, springs, explosives, electromagnetic launchers (e.g., rail guns), electrostatic launchers, compressed gas launchers, mechanical launchers (including handheld mechanical launchers such as slings), or pressurized fluids (such as a "water rocket"). If only a modest area is to be imaged, the device can simply be thrown in the air.

The size of the vehicle will depend on the sensors on board, the desired height of the flight path, the launch method and other considerations. It is preferred that the vehicle be man-portable, and preferably that it weigh under 5 pounds, if it is to be used by soldiers in the field. It is also preferred that the vehicle be small (e.g., 6–12 inches in length) for this type of application, but larger vehicles (e.g., five feet or more) are also within the scope of the invention.

As the vehicle shown in FIG. 1 ascends, the fins 7, which are canted at an angle, cause the airframe 8 to rotate about its roll axis. In the embodiment shown, the fins 7 are fixed, but deployable and/or adaptable fins (e.g., fins that change angle to maintain a specific roll rate) may also be used. The imager 10 has a lens with an optical axis perpendicular to the airframe's 8 roll axis, and looks out a port in the side of the airframe. An image is captured by the imager 10, and is transmitted to the ground station using transmitter 11. Both the imager and transmitter are powered by the power source 12, which could be a battery, capacitor or other power source. A directional light sensor 13 is tilted at an angle that is between the roll axis and perpendicular to said axis. The purpose of the light sensor 13 is to observe the horizon passing as the vehicle rolls. Since the light sensor has an angular component in the roll plane and the pitch plane, it can obtain data on the roll rate and the pitch rate at the top of the flight path. This is explained in more detail in FIG. 4.

In the embodiment shown in FIG. 2, the imager is a visible light device such as a linear array imager, a rectangular CCD, or the like. Other sensors, such as infrared sensors, chemical sensors, biological sensors, radar, sonar, or other sensors may be appropriate for some applications. Those of ordinary skill in the art will see how to select an appropriate sensor for a given embodiment. In addition, it may be desirable in many cases to include multiple sensors (e.g., a chemical or biological "sniffer" may be mounted on the vehicle in addition to a light camera), not all of which need generate locationally specified image data.

Figure 3:
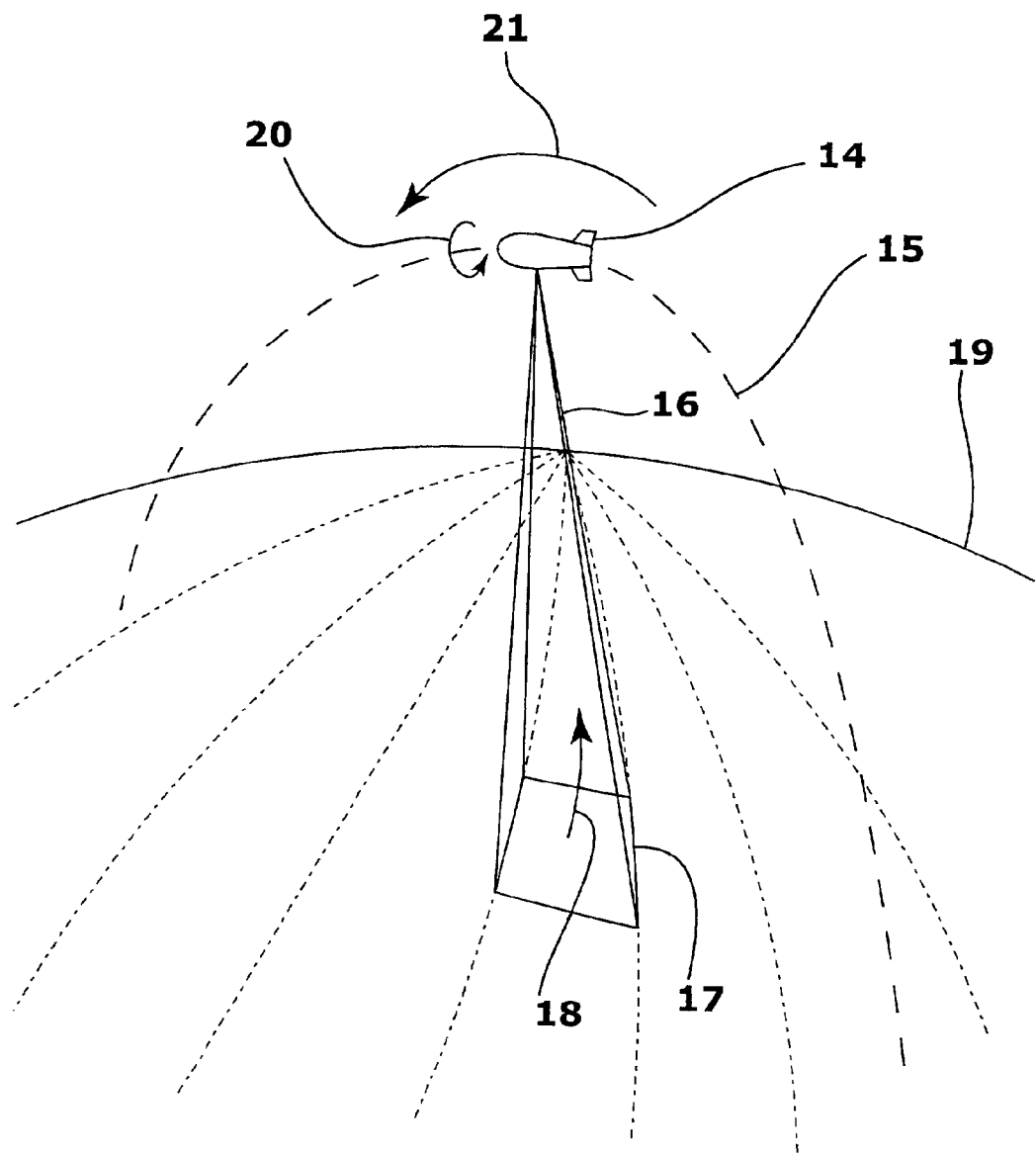
FIG. 3 shows the flight path of the vehicle and the scan pattern used to cover the ground in one embodiment of the invention.

FIG. 3 shows the aerial vehicle 14 flying along the ballistic flight-path 15. As the airframe 8 spins along the roll axis 20, the imaging device's 10 field of view 16 is swept along the ground 17 in a plane 18 perpendicular to the aerial vehicle's flight path. As the aerial vehicle 14 arcs over at the peak of its ballistic trajectory 15, the rotation along the pitch axis 21 causes the imaging device to sweep out incrementally different paths along the ground with each sweep intercepting the horizon 19 at a point perpendicular to the aerial vehicle's flight path 15 at its apogee. In an aerodynamic vehicle such as the one shown in FIG. 3, the center of mass of the vehicle should be placed forward of the center of pressure, so that the vehicle will arc over the ground and sweep through a large enough pitch range. In some preferred embodiments, the flight path and roll rate are selected so that images can be captured in all directions over a very short flight distance at apogee, so that image data is collected from a substantially stationary point.

Figure 4:
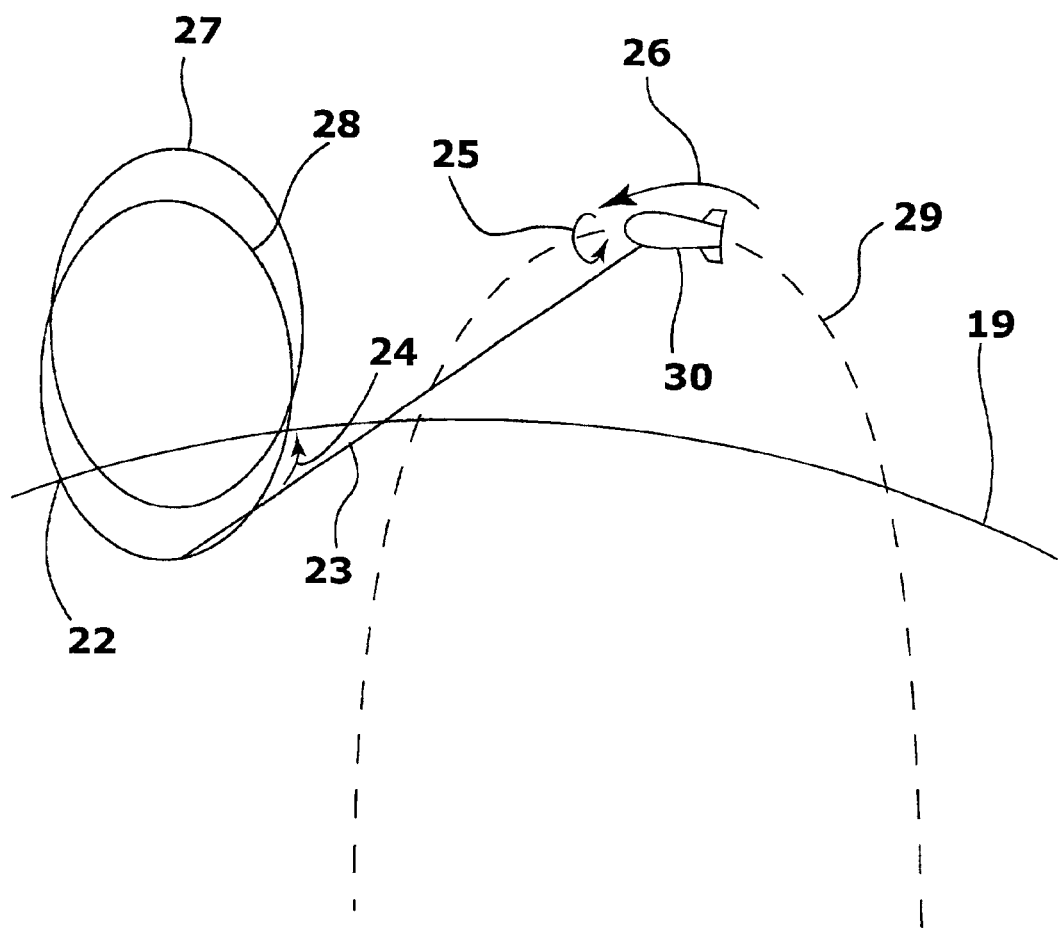
FIG. 4 shows a scan pattern for a horizon sensor to obtain roll and pitch information from a single sensor.

FIG. 4 shows how the light sensor 13 is used to determine the orientation of the vehicle when each image is taken by the imager 10. As the vehicle 30 rotates about its roll axis 25, the directional light sensor's field of view 23 traces out a circle 28. When the light sensor's field of view 23 crosses the horizon at 22, it detects a different light level. The frequency of change of this difference in light level can be used to determine the vehicle's roll rate, and by interpolating between sequential horizon crossings, the imager's roll position can be determined. As the vehicle 30 arcs over in the pitch direction 26, the circles traced out by the light sensor 27, 28 will intersect the horizon at different points. The fraction of the circle above or below the horizon can be used to determine the pitch angle, and interpolating between two different circles can be used to find the pitch rate and angle at any moment in time. The data from the light sensor is transmitted to the ground using the audio channel of the TV transmitter 11, and saved on the computer 4 on the ground to be used to reconstruct the flight path.

As each image or datum is transmitted from the imager 10 to the ground station, the computer 4 places the data in the appropriate place in a spherical data set by using the position information interpolated from the light sensor 13 data. If the light sensor is not present, the same flight information can be obtained from the images themselves. The roll rate is determined by the frequency of the horizon passing through the images, and the pitch is obtained from the angle of the horizon to that of the imager. (In appropriate situations, features other than the horizon may be used in the same way to determine roll and pitch). Orientation may also be measured in a variety of other ways, such as with an inertial device such as a gyroscope; using a wide-angle lens to create a lower resolution, wide-area view with which images may be correlated; with a magnetic sensor such as a compass; using an altimeter and/or a time-of-flight monitor to infer the ballistic trajectory; by measuring the polarization of ambient light to detect the position of the sun; or by using a light intensity sensor to detect the sun (or another distinctive light source such as the moon, the stars, or artificial lighting) directly.

After the imager 10 has been swept over all of the ground visible from the top of the flight path, the vehicle may be recovered by parachute, or allowed to crash to the ground (e.g., if it is disposable). In preferred embodiments of the invention, the images collected by the vehicle are transmitted by a data transmitter to a ground station. The ground station may be, for example, a laptop computer. If the vehicle is recoverable, it can be "plugged in" to the ground station to download data, or it may transmit data to the ground station during flight. Disposable vehicles will generally transmit data to the ground system during flight, for example by wireless transmission or via a tether wire.

The transmitted data set can then be displayed on a computer screen. In preferred embodiments, the operator can zoom and pan around the image, or perform other manipulations such as overlaying the images on a map. Since a typical data set covers all or a significant portion of a sphere, the image can even be viewed in a three-dimensional virtual reality system.

It will often be desired to determine the absolute location, as well as the orientation, of images captured by the system. This may be done, for example, by placing a Global Positioning System (GPS) receiver on the vehicle. The GPS receiver may also be used to orient the images, since the position of the vehicle can be determined with high accuracy. The GPS data is preferably used to determine the exact trajectory of the vehicle, which is combined with roll rate data measured by one of the other means described above to place images. The trajectory can also be measured by knowing the initial launch point and obtaining directional information from the vehicle or launcher, for example by using a magnetic compass. Location may also be determined by manual or automatic matching of the image with maps, survey photos, or other recorded information about the area. If the location of the launch point and the orientation of launch are known, these data can be used to project the trajectory of the vehicle to determine the location of the image.

One advantage of this embodiment of the invention is that the vehicle should be very difficult to detect. It is small, quiet, and is only in the air for a matter of seconds. This invention is low cost, can be disposable, and obtains a single set of images per flight. It is small enough that the operator could carry several expendable flight vehicles for use as needs dictate.

Other solutions to obtaining biaxial scans of the imaging device are also contemplated within the scope of the invention. Imagers may be gimbaled in one or two axes on the launch vehicle, instead of using roll and pitch to scan the imager. Gimbaled systems may deploy parachutes, collecting data while the vehicle descends, for example. "Loitering" systems may also be used with gimbaled cameras. In such systems, the operator may be able to override the scanning function of the imager in order to focus on particular areas of interest.

In yet another useful embodiment of the invention, a ballistic launch vehicle can be launched over a feature of interest (such as a building), and images collected from the full arc of the ballistic trajectory can be used to create a three-dimensional model of the overflight area.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. An aerial reconnaissance vehicle system, comprising: a portable, unmanned vehicle; a propulsion device to place said vehicle high above the launch point; an imaging device mounted on said vehicle to gather imagery data; first rotation means for rotating the imaging device to cause it to scan across a sensed area about a first axis at a rate selected for image capture; second rotation means for rotating the imaging device to cause it to scan across the sensed area about a second axis at a rate selected for image capture; and a data transmitter that transmits data gathered by the imaging device, wherein the means for determining the orientation of the imagery data comprise a directional light sensor sweeping past the horizon to determine one or more of the roll rate, roll position, pitch rate, and pitch position of the vehicle.

2. The aerial reconnaissance vehicle of claim 1, wherein the vehicle is man-portable.

3. The aerial reconnaissance vehicle of claim 1, further comprising means for placing the imagery data in a data set that represents the scene imaged by the imaging device.

4. The aerial reconnaissance vehicle of claim 3, wherein the data set that represents the scene imaged by the device comprises a three-dimensional representation of the scene.

5. The aerial reconnaissance vehicle of claim 1, wherein the imaging device comprises a linear array imager, rectangular CCD, or other electronic imaging device.

6. The aerial reconnaissance vehicle of claim 1, wherein the imaging device comprises a film camera.

7. The aerial reconnaissance vehicle of claim 1, wherein the portable unmanned vehicle travels on a ballistic trajectory, a sensing axis of the imaging device being pointed transverse to the roll axis of the vehicle.

8. The aerial reconnaissance vehicle of claim 7, wherein the first rotation means causes the imaging device to scan across the sensed area about the first axis using a rotation about the vehicle roll axis.

9. The aerial reconnaissance vehicle of claim 8, wherein the first rotation means comprises fins at an angle of attack that provides a rolling moment.

10. The aerial reconnaissance vehicle of claim 9, wherein the fins are fixed.

11. The aerial reconnaissance vehicle of claim 9, wherein the fins are movable.

12. The aerial reconnaissance vehicle of claim 7, wherein the second rotation means causes the imaging device to scan across the sensed area about the second axis using the pitch axis at the apogee of the ballistic trajectory.

13. The aerial reconnaissance vehicle of claim 1, wherein the propulsion device comprises a motor or engine.

14. The aerial reconnaissance vehicle of claim 1, wherein the propulsion device comprises a spring mechanism.

15. The aerial reconnaissance vehicle of claim 1, wherein the propulsion device comprises an explosive charge.

16. The aerial reconnaissance vehicle of claim 1, wherein the propulsion device comprises compressed gas.

17. The aerial reconnaissance vehicle of claim 1, wherein the propulsion device comprises a mechanical launcher.

18. The aerial reconnaissance vehicle of claim 1, wherein the propulsion device comprises a pressurized fluid.

19. The aerial reconnaissance vehicle of claim 1, wherein the propulsion device comprises means for absorbing the kinetic energy from a projectile fired from a gun.

20. The aerial reconnaissance vehicle of claim 1, wherein the means for determining the orientation of the imagery data comprise an inertial device to determine the orientation of the vehicle.

21. The aerial reconnaissance vehicle of claim 20, wherein the inertial device comprises a gyroscope.

22. The aerial reconnaissance vehicle of claim 1, wherein the means for determining the orientation of the imagery data comprise a wide-angle lens mounted on the vehicle.

23. The aerial reconnaissance vehicle of claim 1, wherein the means for determining the orientation of the imagery data comprises means for analyzing the imagery data obtained by the imaging device to determine the orientation of the vehicle.

24. The aerial reconnaissance vehicle of claim 23, wherein the means for analyzing the imagery data include means for determining the pitch rate and roll rate of the vehicle in order to determine image spacing.

25. The aerial reconnaissance vehicle of claim 1, further comprising a Global Positioning System (GPS) receiver that determines the true orientation or location of the vehicle.

26. The aerial reconnaissance vehicle of claim 1, further comprising a magnetic sensor that determines the orientation of the vehicle relative to the Earth's magnetic field.

27. The aerial reconnaissance vehicle of claim 1, further comprising a polarized light sensor that determines the orientation of the vehicle relative to the polarization direction of the ambient light.

28. The aerial reconnaissance vehicle of claim 1, further comprising a light level sensor that uses the position of the sun or another distinctive light source to determine the orientation of the vehicle.

29. The aerial reconnaissance vehicle of claim 1, further comprising a sensor selected from the group consisting of biological sensors, chemical sensors, optical sensors, thermal sensors, radiation sensors, electronic emissions sensors, range-finding sensors, and acoustic sensors.

30. A ground station for use with an aerial reconnaissance vehicle, the aerial reconnaissance vehicle system comprising a portable, unmanned vehicle; a propulsion device to place said vehicle high above the launch point; an imaging device mounted on said vehicle to gather imagery data; first rotation means for rotating the imaging device to cause it to scan across a sensed area about a first axis at a rate selected for image capture; second rotation means for rotating the imaging device to cause it to scan across the sensed area about a second axis at a rate selected for image capture; and a data transmitter that transmits data gathered by the imaging device, wherein the ground station comprises a receiver that receives data transmitted by the data transmitter; and means for assembling the data into a unified data set for display or later use, said assembly means comprising means for determining the relative orientation and spacing of a plurality of images, wherein the means for determining the relative orientation and spacing use data from within the plurality of images to determine their orientation and spacing.

31. The ground station of claim 30, further comprising means for viewing of the data set.

32. The ground station of claim 31, wherein the viewing means include panning, zooming or other viewing manipulations.

33. The ground station of claim 30, wherein the means for determining the relative orientation and spacing use data collected by a sensor mounted on the vehicle, said mounted sensor being separate from the sensor used to gather image data.

34. The ground station of claim 33, wherein the mounted sensor is selected from the group consisting of a GPS receiver, an altimeter, a time-of-flight sensor, a magnetic sensor, a polarized light sensor, and a light level sensor.

35. The ground station of claim 30, wherein the means for determining the relative orientation and spacing locate the horizon within one or more of the plurality of images in order to determine the roll rate or roll location.

36. The ground station of claim 30, wherein the means for determining the relative orientation and spacing determine the angle of the horizon within one or more of the plurality of images in order to determine the pitch rate or pitch location.

37. The ground station of claim 30, wherein the means for determining the relative orientation and spacing determine the location of a distinctive feature in order to determine at least one member of the group consisting of roll rate, roll location, pitch rate, and pitch location.

38. The ground station of claim 37, wherein the distinctive feature is selected from the group consisting of the sun, the moon, the stars, and artificial light sources or emissions.

39. The ground station of claim 37, wherein the distinctive feature is the polarization state of ambient light.

40. The ground station of claim 30, wherein the assembly means comprise means for using orientation and spacing data obtained or determined onboard the flight vehicle.

41. The ground station of claim 30, further comprising means for determining the absolute location of images transmitted by the vehicle.

42. The ground station of claim 41, wherein the means for determining the absolute location comprise using GPS data transmitted by the vehicle.

43. The ground station of claim 41, wherein the means for determining the absolute location comprise using a known location of a launch point for the vehicle and a known direction of launch or a measured direction of flight.

44. The ground station of claim 43, wherein the means for determining the absolute location comprise matching the images to a map or a photograph.

* * * * *